(No Model.)
R. W. JOHNSON.
SURGICAL ABSORBENT DRESSING.
No. 582,925. Patented May 18, 1897.
Fig. 1.
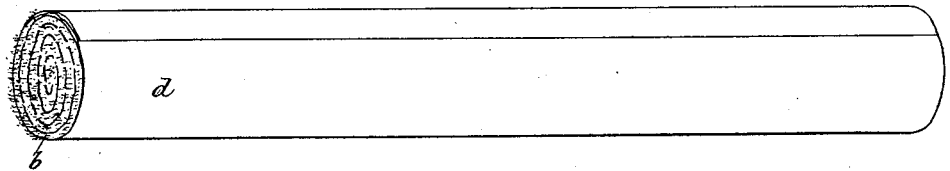
Fig. 2.
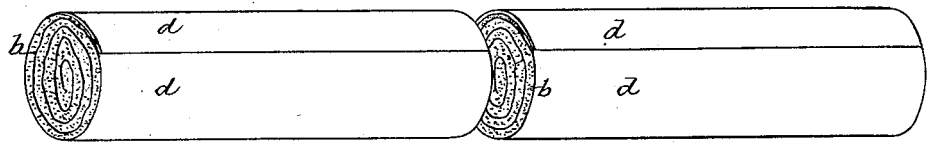
Fig. 4. Fig. 3. Fig. 5.
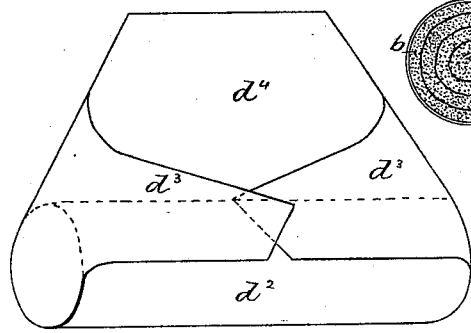 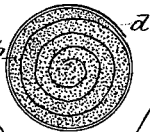 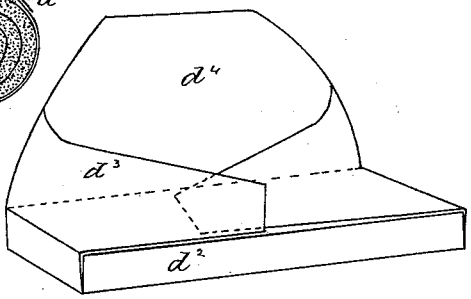
Fig. 6.
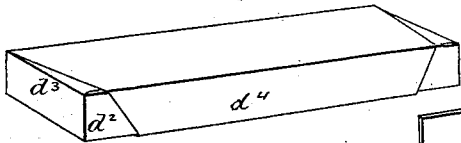
Fig. 7.
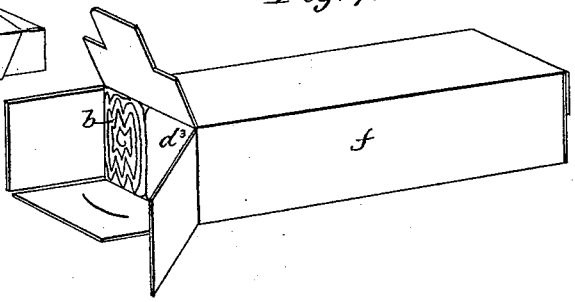
WITNESSES
A. B. Degges
L. S. Heinrichs
INVENTOR
Robert W Johnson,
by E. E. Masson, Attorney.

UNITED STATES PATENT OFFICE.

ROBERT W. JOHNSON, OF NEW BRUNSWICK, NEW JERSEY.

SURGICAL ABSORBENT DRESSING.

SPECIFICATION forming part of Letters Patent No. 582,925, dated May 18, 1897.

Application filed May 27, 1895. Serial No. 550,821. (No specimens.)

*To all whom it may concern:*

Be it known that I, ROBERT W. JOHNSON, a citizen of the United States, residing at New Brunswick, in the county of Middlesex, State of New Jersey, have invented certain new and useful Improvements in the Art of Treating, Sterilizing, and Packaging Cotton, of which the following is a specification, reference being had therein to the accompanying drawings.

My invention relates to surgical dressings of cotton lint and also of cotton gauze; and the objects of my improvement are to render them sterile by subjecting them to heavy pressure and retaining them in this sterile condition by having them sealed in coverings substantially impermeable while under pressure and retaining them in this compressed condition, whereby their bulk is greatly reduced.

Various means have been used to render surgical dressings as near aseptic as possible, but as the new system of antiseptic and aseptic surgery depends upon having perfectly aseptic dressings new means had to be discovered to obtain this condition and retain it until the dressings are to be used. In the manufacture of absorbent cotton great care is taken in first cleaning it with filtered and substantially sterile water, handling the cotton by machinery rather than allowing human hands to touch it, sterilizing it by antiseptics or by heat of about 275° Fahrenheit, that will kill nearly all kinds of germs, in a closed room, so that the cotton or dressings will be as near sterile as possible; but I have found by trials and practice that the best method or means of sterilizing said cotton or dressings and keeping it sterilized is by subjecting them while inclosed in a substantially impermeable wrapper to a pressure of twenty tons or more to the square inch, by which all forms of life are destroyed.

The improvements in the art are partly illustrated in the accompanying drawings, in which—

Figure 1 is a perspective view of a bat of absorbent cotton coiled spirally with tissue-paper in the form of a compact roll having its periphery also covered by said tissue-paper. Fig. 2 is a perspective view of a similarly coiled and covered roll cut smoothly at the ends and also across in two lengths. Fig. 3 is a transverse section of one of said rolls. Fig. 4 represents a perspective view of one of said short rolls having its sides and ends additionally inclosed in a wrapper of tissue-paper, the ends of said wrapper being folded over the ends of the roll and tucked inwardly in position to be secured by the outer flap of said wrapper. Fig. 5 is a perspective view of a similarly-wrapped roll after it has been subjected to a very heavy pressure within a rectangular receiver, one of the flaps of the wrapper being turned up to show the inner folds. Fig. 6 is a perspective view of one of the packages of compressed and sterilized cotton obtained by my improved means and method. Fig. 7 is a perspective view of two of the compressed and sterilized packages inclosed in a jacket of stronger and stiffer paper or cardboard to protect the tissue-paper wrapper from injury. Within said jacket the tissue-paper of one of the packages is torn off to show the position occupied by the spiral coils after having been subjected to heavy pressure.

To prepare cotton so as to render it aseptic and packaging it in said aseptic form, so as to maintain its sterilization, by my method, until after it has been in use, the cotton is first cleaned and washed and bleached in filtered or distilled water. Its fibers are then dried in a close room heated to about 250° Fahrenheit, and then it is formed into a thin bat $b$, which is spread upon tissue-paper $d$ and both wrapped spirally together in as compact a roll as possible, as shown in Fig. 1, the length of the paper being such as to go at least once around the exterior of the roll to perfectly protect its sides against contact with the air and its impurities, but its fuzzy ends are then still partially exposed.

To remove the defective condition of the roll, a small portion of its ends is removed by rapidly-revolving knives moving at right angle to the axis of the roll, giving to said ends a board-like smoothness. The roll is also preferably cut transversely in two or three pieces of predetermined lengths, as shown in Fig. 2, to be packed together.

To protect the ends of the rolls, each roll is then carefully wrapped in a sheet of tissue-paper $d^2$, that incloses the sides and ends of the roll, the end flaps $d^3$ being folded inwardly, as shown in Fig. 4, in position to be retained by the circumferential flap $d^4$, that is to be folded upon the flaps $d^3$. In this condition the cotton and its inclosure are as nearly sterile or aseptic as the nature of the air surrounding its preparation and its wrapper will permit it; but as modern surgery demands perfectly aseptic dressings additional means must be used to seal the package while under pressure, so as not likely to be impregnated with germs from the air or from the operatives while packaging or sealing it. For this purpose the roll of cotton wholly wrapped in tissue-paper, substantially as shown in Fig. 4, but with all its covering flaps closed, is placed within the chambered matrix of a press and subjected to a pressure of twenty tons or more to the square inch, and if the matrix is in the form of a parallelogram (as it is preferred) the package takes the form shown in Fig. 6, and its consistence is nearly the same as soft-pine lumber.

If it is desired to have the outer tissue-paper covering free of wrinkles in its sides, the cotton roll (shown in Fig. 2) is first subjected to a pressure of twenty tons to give thereto approximately its final rectangular form while expelling the air therefrom, and then it is wholly wrapped in the sheet of tissue-paper $d^4$, placed again in the press, and subjected with its wrapper to a pressure of twenty tons or more. It can in that condition be sent to surgeons or to hospitals without danger of its contents losing their aseptic condition; but to protect the tissue-paper inclosure from abrasion two or more of the compacted and sealed cotton rectangular packages are generally placed side by side in a box $f$, of cardboard or of stronger paper, as shown in Fig. 7, the sides of which fit closely against the sides of the cotton packages; but said box $f$ is generally provided with flaps at both ends, so that one or more of the cotton packages can readily be pushed out when desired to be used.

Aseptic gauze dressing prepared, packed in tissue-paper, and sealed therein and subjected to heavy pressure retains its aseptic properties as well as the cotton dressing above described.

Having now fully described my invention, I claim—

1. The improvement in the art of treating and packaging cotton which consists in washing and sterilizing the cotton fibers, drying them, batting the same and placing the bat on tissue-paper, wrapping both the bat and the tissue-paper by coiling them spirally together in a roll, cutting the roll at right angles to its axis, subjecting the compound roll to heavy pressure applied against its sides and ends, and inclosing the same in boxes closely fitting the sides and ends thereof, whereby the sterilization of the cotton is maintained substantially as described.

2. Absorbent cotton or other fibrous surgical dressings compressed as, and to the degree described, whereby any living germs therein are killed, substantially as described.

3. A package of absorbent cotton wound in layers with paper between each layer, the whole constituting a coil having its ends cut at right angles to its axis and wrapped in paper, and both the cotton and the wrapper sterilized by a pressure sufficient to kill all germs therein substantially as described.

In testimony whereof I affix my signature in presence of two witnesses.

ROBERT W. JOHNSON.

Witnesses:
L. MATHEWS,
EDWARD MORRIS.